No. 733,096. PATENTED JULY 7, 1903.
W. D. TYLER.
AUTOMATIC WEIGHING MACHINE.
APPLICATION FILED OCT. 4, 1902.
NO MODEL.
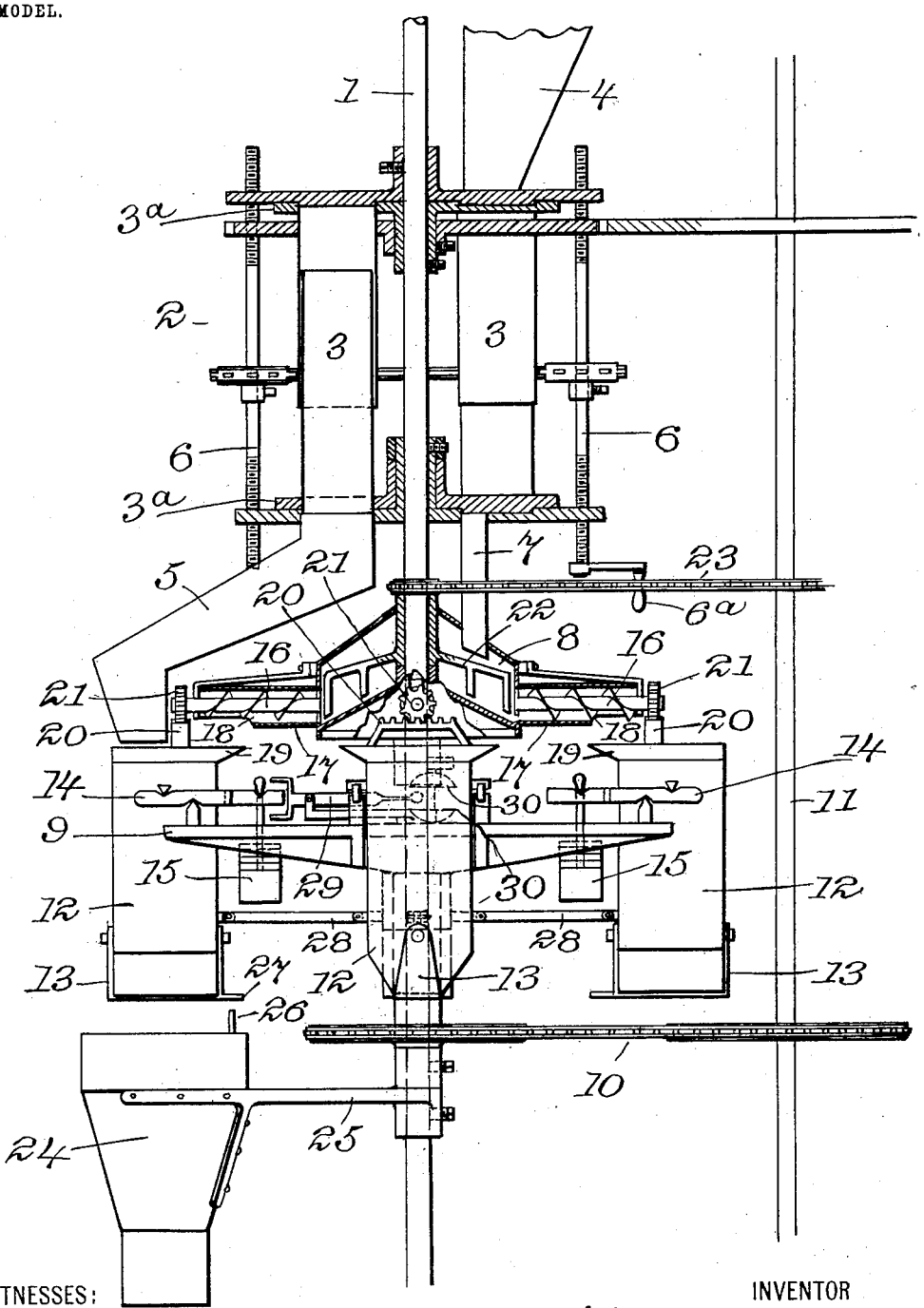
WITNESSES:
INVENTOR
William D. Tyler
BY
ATTORNEY No. 733,096. Patented July 7, 1903.

UNITED STATES PATENT OFFICE.

WILLIAM D. TYLER, OF BROOKLYN, NEW YORK.

AUTOMATIC WEIGHING-MACHINE.

SPECIFICATION forming part of Letters Patent No. 733,096, dated July 7, 1903.

Application filed October 4, 1902. Serial No. 125,936. (No model.)

*To all whom it may concern:*

Be it known that I, WILLIAM D. TYLER, a citizen of the United States of America, and a resident of the borough of Brooklyn, county of Kings, city and State of New York, have invented certain new and useful Improvements in Automatic Weighing-Machines, of which the following is a specification.

My invention relates to mechanism for automatically feeding, weighing, and delivering granular or other finely-divided material in uniform quantities, the same being specially designed for use in connection with apparatus by which the material to be weighed is first measured out in charges of somewhat less than the desired weight. A preferred form of such measuring apparatus is described and claimed in my pending application filed October 5, 1901, and serially numbered 77,685.

Mechanism embodying my present invention is illustrated in the accompanying drawing by a view in sectional elevation.

Referring to the drawing, 1 represents a fixed upright shaft or standard which may be bracketed to a wall or otherwise mounted and serves as a support for measuring apparatus 2, the construction and operation of which are fully described in my pending application above referred to. While any suitable apparatus may be employed for this purpose, I prefer the form shown, which consists, essentially, of telescoping receptacles 3 3, mounted on rotatable tables to travel between a hopper 4 and the discharge-spout 5, such receptacles in passing under the hopper receiving a charge of material a little short of the desired weight, which material is subsequently discharged through the spout as each receptacle passes above the open end of the same. A suitable adjusting device, such as the screw-shafts 6 6 and the connecting-sprocket, may be employed to vary the size of the telescoping receptacles 3 3 as may be required. Fitted in an opening of the stationary platform of the measuring apparatus and depending therefrom there is a tube 7, which is so placed as to receive a small quantity of material from each of the rotating receptacles as they pass over the upper end of the same. This material is discharged into the fixed hopper 8 of the weighing mechanism for a purpose to be later on described.

At a point beneath the measuring apparatus and on the same shaft there is mounted a rotating table 9, which is driven by the sprocket-gear and chain 10 from the power-shaft 11. This table serves as a rotating support for a number of cans 12 12, &c., and is cut away at equispaced points throughout its circumference to provide recesses to receive the same. The cans are open at the top and have their opposite sides tapered to reduce the bottom opening, which is normally closed by a swinging bottom 13, pivoted thereto. Each can is carried in the bifurcated end of a scale-beam 14, the counterweight 15 of which depends therefrom through an opening in the table. Thus mounted the cans travel in a circular path as the table rotates and successively pass beneath the open end of the spout 5 to receive a charge of material therefrom.

As the material contained in each can is somewhat less than the desired weight, I provide a graduated feed for supplying the deficiency. This feed comprises a non-rotatable hopper or annular receptacle 8, which is supplied through the tube 7, above referred to, and a series of feed-screws 16 16, &c., extending radially outward therefrom and corresponding in number to the cans 12. Each feed-screw is mounted in a tubular casing 17, which is cut away on the under side near its outer end to provide a discharge-opening 18. A lip or flange 19 on each of the cans forms a flaring mouth, which extends beneath these discharge-openings and catches the material fed through the same. The feed-screws are rotated by rack-bars 20, secured to the cans, meshing with pinions 21 upon the outer end of the screw-shafts. In order to prevent the material in the annular chamber from banking or becoming solidly packed, one or more stirrer-arms 22 are provided therein and driven by the chain and sprocket-gearing 23 from the power-shaft 11. A funnel 24 is adjustably secured upon the shaft 1 by a bracket 25 in the path of travel of the cans 12, but at a point beneath the same. Normally—that is, when the cans are empty or do not contain the full weight of material—they are maintained elevated by the scale-beams with their rack-bars in position to engage the pinions upon rotation of the table. As the rack-bars in travel mesh with the pinion, the latter rotate the feed-screws and cause a certain amount of material to be fed into the cans. When the full weight of material is made up by means of this graduated feed, it tips the scale-beam, and the can is thereby lowered sufficiently to carry its rack-bar below and clear of the pinions, and consequently there will be no further feed into a can thus adjusted. This discharge of the material from a can is effected by the trip-pin 26 on the funnel 24 engaging the projection 27 on the swinging bottom of each can as the latter in rotation passes above the funnel.

In order to overcome centrifugal force which would tend to swing the cans outward as the table rotates, and thereby interfere somewhat with the action of the weighing mechanism, the lower or free end of each can is connected to the hub of the table by a pivotally-secured link 28.

If for any reason more or less than the intended weight of material should be fed into a can as it passes the last feeding device of the series, it is desirable that the attendant should be notified, and to effect this I provide an audible signal, consisting of a yoked arm 29, pivotally mounted upon a non-rotatable support, such as a bracket-arm, adjustably secured to the shaft. The arm is so arranged that its yoked end straddles the end of each scale-beam just before the can is ready to dump—that is to say, before it reaches a point in its travel above the hopper 24—and the opposite end of the arm is provided with a striker lying between two gongs 30 30. By this arrangement it will be seen that if the weight of material in a can is more or less than the machine is set to weigh the scale-beams in passing through the yoked end of the signal-arm will engage therewith and cause the same to strike the gong and notify the attendant.

For the purpose of illustrating the entire machine assembled I have shown the spout 5 located directly above the funnel 24; but it will be understood that in practice these parts will be so relatively arranged that a short-weight charge will be dumped into each can after it has discharged its full-weight charge into the funnel and passed over the same.

The operation is as follows: The members of the telescoping receptacles of the measuring apparatus are first adjusted by turning the crank $6^a$ either to the right or left and thereby rotating the several screw-shafts through the connecting sprocket-gearing to lengthen or shorten the receptacles, as may be required. Assuming that a certain amount of material has been placed in the hopper 8 of the weighing mechanism, the machine is ready for starting. The rotating tables $3^a$ $3^a$, carrying the receptacles of the measuring apparatus, may be driven from the shaft 11 by the gears $3^b$ $3^b$ shown or in any other suitable manner. The receptacles in passing beneath the hopper 4 are each filled with material, which is carried around under the continued rotation of the tables and discharged through the spout 5 into the cans of the weighing mechanism. The relative arrangement and speed of the cans 12 12 are such that as a charge of material enters the spout a can passes under the lower end thereof to receive the same. After receiving the material in the manner described each can under the rotation of the table is carried around and its rack-bar successively engages the pinions of the several feed-screws, causing a regulated amount of material to be fed from each tube into the open mouth of the can as it passes under the same. This operation continues until the full weight of material has been supplied, and thereupon the scale-beam is tipped and the can descends, carrying its rack below and clear of the pinion and continuing in this position until the charge is dumped into the funnel by the pin 26 tripping the swinging bottom of the can. Ordinarily an attendant places a bag or other form of package beneath the funnel 24 to receive each charge as it is delivered.

Some of the main advantages of my invention are as follows: The machine is entirely automatic in its action and requires only one attendant to place bags, boxes, wrappers, or the like in position to receive the full-weight charges delivered, and as this may be readily done by a boy or girl the cost of operating the machine is reduced to a minimum. As both the measuring and weighing mechanisms employ continuously-rotating carriers, the machine may be run at quite a high speed and with a largely-increased output, its capacity being limited only by the rate at which the bags or the like are placed in position to receive the charges.

All complication is avoided and the construction, adjustment of parts, &c., are extremely simple and may be readily understood by unskilled persons. The action of the receptacles in operating the feed individually and discontinuing the same after the charge has been brought up to full weight prevents waste and insures accuracy and uniformity in the weight of the charges delivered.

It will be understood that I do not wish to limit myself to the exact details of construction herein shown and described, as various changes may be made without departing from the spirit and scope of my invention. For example, other forms of feed mechanism might be substituted for that shown and each receptacle provided with means for controlling the same in substantially the manner described. Other forms of receptacle might be employed and the same differently mounted relatively to both the scales and the rotating table. The short-weight charges might be delivered by other forms of measuring apparatus, &c., but all such changes I consider obvious and immaterial variations of form and not of substance and still within the meaning of the present invention.

Having, therefore, described my invention, I claim—

1. The combination of a series of continuously-traveling receptacles adapted to receive in bulk short-weight charges of material to be weighed, stationary supplemental feed mechanism operated intermittently or while the receptacle is passing beneath the same to gradually increase the contained charge to full weight and means for automatically discontinuing the feed in the particular receptacle or receptacles containing such full-weight charge.

2. The combination of a series of receptacles mounted upon a continuously-rotating support and adapted to receive in bulk short-weight charges of material to be weighed, intermittent feed mechanism for gradually increasing the charge in each receptacle to full weight and means for automatically discontinuing the feed in the particular receptacle or receptacles containing such full-weight charge.

3. The combination of a series of receptacles each mounted as a scale-pan upon a continuously-rotating support and adapted to receive in bulk short-weight charges of material to be weighed, said support being common to the several receptacles, intermittent feed mechanism for gradually increasing the charge in each receptacle to full weight and means for automatically discontinuing the feed in the particular receptacle or receptacles containing such full-weight charge.

4. The combination of a series of receptacles adapted to receive in bulk short-weight charges of material to be weighed, each of said receptacles being carried by a scale-beam mounted upon a continuously-rotating support, intermittent feed mechanisms, an actuating device on each receptacle for successively operating the feed mechanisms to gradually increase the contained charge to full weight and thereby tip the scale-beam, the arrangement being such that the tipping of the scale disengages the feed-actuating device of the particular receptacle or receptacles containing such full-weight charge.

5. The combination of a continuously-rotating support, a series of weighing-scales mounted thereon, a receptacle carried by each scale-beam, and adapted to receive in bulk short-weight charges of material to be weighed, said receptacles being open at the top and provided with a swinging bottom, a series of stationary feed mechanisms corresponding in number to the receptacles and arranged above the same, an actuating device carried by each receptacle for successively operating the feed mechanisms on passing under the same to gradually increase the charge to full weight and thereby tip the scale and disengage the feed-actuating device of the receptacle or receptacles containing such full-weight charge and means for automatically dumping the full-weight charges.

6. The combination of a continuously-rotating table, a series of weighing-scales mounted thereon and provided with an off-weight signal, a receptacle carried by each scale-beam and adapted to receive in bulk short-weight charges of material to be weighed, said receptacles being open at the top and provided with a swinging bottom, a stationary hopper arranged centrally of the table and provided with a series of feed-screws projecting radially therefrom above the receptacles, each of said screws having a pinion secured upon its outer end, rack-bars upon the receptacles adapted to mesh with the pinions and rotate the feed-screws as the receptacles pass under the same, thereby gradually increasing the charge to full weight and causing the receptacles containing such full-weight charges to descend as the scale-beam tips, and carry their rack-bars below the plane of the pinions, and means for automatically dumping the full-weight charges.

7. The combination of a series of continuously-traveling receptacles, measuring apparatus for delivering in bulk short-weight charges of material to the receptacles, stationary feed mechanisms operated successively by the receptacles in passing beneath the same to gradually increase the charges to full weight and a supply connection between the measuring apparatus and the feed mechanism.

8. The combination of a continuously-rotating weighing mechanism, a continuously-rotating measuring apparatus for delivering in bulk short-weight charges of material to the weighing mechanism, supplemental feed mechanism operating intermittently or when the receptacle is passing beneath the same to gradually increase the charges to full weight, and a supply connection between the measuring apparatus and the feed mechanism.

Signed at New York this 27th day of September, 1902.

WILLIAM D. TYLER.

Witnesses:
  W. H. PUMPHREY,
  M. G. CRAWFORD.